United States Patent
Lohrentz

(10) Patent No.: US 9,635,807 B2
(45) Date of Patent: May 2, 2017

(54) AGRICULTURAL HEADER ROW UNIT FOR HARVESTING STALK RESIDUE

(71) Applicant: AGCO Corporation, Hesston, KS (US)

(72) Inventor: Randy Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/904,451

(22) PCT Filed: Jul. 16, 2014

(86) PCT No.: PCT/US2014/046810
§ 371 (c)(1),
(2) Date: Jan. 12, 2016

(87) PCT Pub. No.: WO2015/009797
PCT Pub. Date: Jan. 22, 2015

(65) Prior Publication Data
US 2016/0143217 A1 May 26, 2016

Related U.S. Application Data

(60) Provisional application No. 61/847,241, filed on Jul. 17, 2013.

(51) Int. Cl.
*A01D 45/02* (2006.01)
*A01D 34/01* (2006.01)
(Continued)

(52) U.S. Cl.
CPC ......... *A01D 34/015* (2013.01); *A01D 45/021* (2013.01); *A01D 57/06* (2013.01); *A01D 2101/00* (2013.01)

(58) Field of Classification Search
CPC ............................. A01D 45/021; A01D 45/025
(Continued)

(56) References Cited

U.S. PATENT DOCUMENTS 706,614 A 8/1902 Wallis
2,527,786 A * 10/1950 Barkstrom ........... A01D 45/021
56/60

(Continued)

FOREIGN PATENT DOCUMENTS

DE 4201067 A1 7/1993
EP 0369440 A1 5/1990
(Continued)

OTHER PUBLICATIONS

International Search Report prepared for International Patent Application No. PCT/US2014/046810, mailed Oct. 27, 2014.

*Primary Examiner* — Thomas B Will
*Assistant Examiner* — Mai Nguyen

(57) ABSTRACT

A harvesting header for a row crop machine has a plurality of row units having fore-and-aft extending arms forming a passageway, a gathering mechanism to gather stalks into the passageway, snap rolls to pull the stalks downwardly through the passageway, and a knife set to cut the stalks in the passageway. The knife set includes a pair of opposing blades, each blade having a main portion with an inner edge located on a first side of a centerline of the passageway and a cutting protrusion with a sharpened cutting edge extending across the centerline toward the opposing blade. The cutting protrusions are offset longitudinally from one another such that the cutting protrusion of one of the blades is a different distance from a mouth of the passageway than the cutting protrusion of the opposing blade such that there is a continuous gap between the blades along the length of blades.

6 Claims, 4 Drawing Sheets

(51) Int. Cl.
*A01D 57/06* (2006.01)
*A01D 101/00* (2006.01)

(58) Field of Classification Search
USPC .................................. 56/101; 30/278, 279.2
See application file for complete search history.

(56) References Cited

U.S. PATENT DOCUMENTS

| | | | | |
|---|---|---|---|---|
| 2,604,749 | A * | 7/1952 | Fergason | A01D 45/025 |
| | | | | 56/103 |
| 3,528,233 | A * | 9/1970 | Phillips | A01D 45/021 |
| | | | | 56/105 |
| 3,528,234 | A * | 9/1970 | Kowalik | A01D 45/021 |
| | | | | 56/105 |
| 3,589,110 | A * | 6/1971 | Schreiner | A01D 41/142 |
| | | | | 56/106 |
| 3,813,858 | A * | 6/1974 | McDermott | A01D 43/082 |
| | | | | 56/102 |
| 4,805,387 | A * | 2/1989 | Bouin | A01D 45/021 |
| | | | | 56/102 |
| 2009/0188229 | A1 * | 7/2009 | Eagles | A01D 45/025 |
| | | | | 56/119 |

FOREIGN PATENT DOCUMENTS

| | | | |
|---|---|---|---|
| EP | 2335471 | A1 | 6/2011 |
| WO | 8100338 | A1 | 2/1981 |

* cited by examiner

AGRICULTURAL HEADER ROW UNIT FOR HARVESTING STALK RESIDUE

BACKGROUND OF THE INVENTION

Field of Invention

This invention relates to a row-crop harvesting header for a combine harvester, and more particularly, to a row unit for the header that harvests stalk residue.

Description of Related Art

Agricultural harvesters such as combines are typically equipped with a harvesting header. For example, corn headers are specifically designed to pick corn and vary in size from two-row units to twelve-row units or more. Corn header row units typically use gathering chains to covey crop material and ears rearward toward a cross auger. A set of driven snap rolls grabs the corn stalks and forces them downward between stripper plates. The ears of corn are snapped free of the stalk and the cross auger passes the ears to the feeder housing of the combine harvester and the stalks are left on the ground. It is known to collect the crop residue (crop material other than grain) so that this residue can be used for conversion into fuel. Recovering the stalk material has required separate operations, for example, the use of a combine harvester to sever the stalks from the ground and the use of a baler to gather the stalks and form them into bales.

Recently, it has become desirable to tow the baler directly behind the combine harvester so that the baler receives at least a portion of the crop residue discharged from the combine harvester rather than have the crop residue impact the ground. U.S. Pat. No. 8,464,508 entitled "Baler Pickup for Collecting Biomass from a Combine Harvester" discloses such a harvester and baler.

It is desired then to provide a row unit for a harvesting header that harvests at least some of the stalk residue with the ears to better feed the baler.

OVERVIEW OF THE INVENTION

In one embodiment, the invention is directed a row-crop harvesting header for use with a harvesting machine. The harvesting header includes a plurality of transversely spaced row units having fore-and-aft extending arms forming a passageway, a gathering mechanism to gather stalks of a row crop into the passageway, snap rolls to pull the stalks downwardly through the passageway, and a knife set configured to cut the stalks in the passageway. The knife set includes a pair of opposing blades, each blade having a main portion with an inner edge located on a first side of a centerline of the passageway and a cutting protrusion with a sharpened cutting edge extending across the centerline toward the opposing blade. The cutting protrusions are offset longitudinally from one another such that the cutting protrusion of one of the blades is a different distance from a mouth of the passageway than the cutting protrusion of the opposing blade such that there is a continuous gap between the blades along the length of blades.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the harvesting header.

Figure 1:
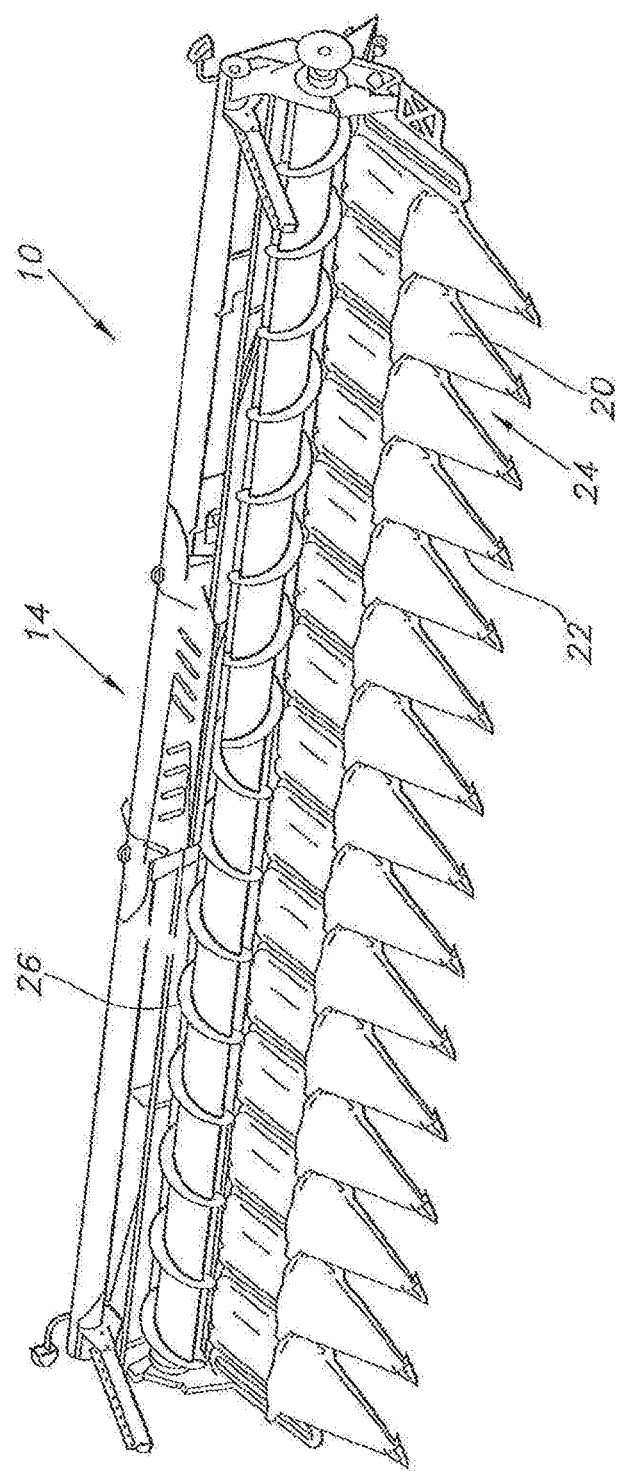
FIG. 1 is a perspective view of a corn head for use with a harvesting machine.

Referring now to the drawings, and particularly to FIG. 1, a harvesting header for use with an agricultural combine harvester (not shown) is seen generally at 10. As is known in the art, the harvesting header 10 is mounted in a cantilevered manner on a feederhouse (not shown) of the combine harvester at a center area 14 of the harvesting header 10. The illustrated harvesting header 10 shown here is a row crop header designed to harvest multiple rows of corn simultaneously. However, one skilled in the art will understand that harvesting headers for use in harvesting any row crops may utilize concepts described herein without departing from the scope of the invention. The harvesting header 10 including a transversely extending frame 16 across the width of which is attached a plurality of forwardly projecting row units 20 spaced in side-by-side relationship to each other a distance commensurate with that of the spacing between adjacent rows of corn to be harvested, Although sixteen row units 20 are shown here, the harvesting header 10 may have any number of such units, in side-by-side relationship, across its width. Each row unit 20 is desirably constructed and operated in a substantially identical manner through any known means. The row units 20 may have a removable snout or divider 22 hingedly coupled to the front of each of the row units 20 serving to separate comingled stalks of adjacent rows from one another. The crop dividers 22 define longitudinal passages 24 between them which are centered relative to rows to be harvested.

Figure 2:
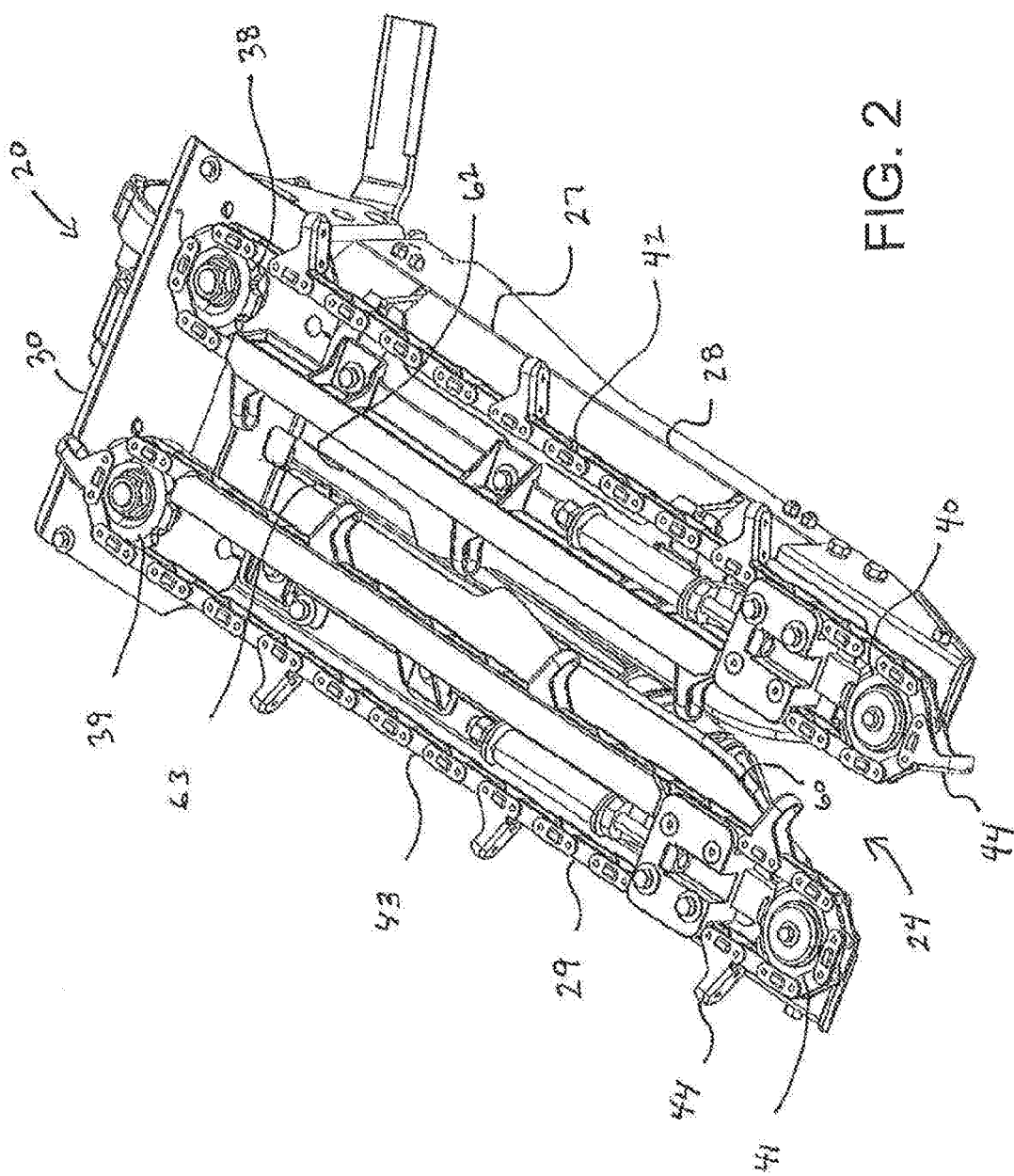
FIG. 2 is a left front perspective view of a row unit of the corn head of FIG. 1.
Figure 3:
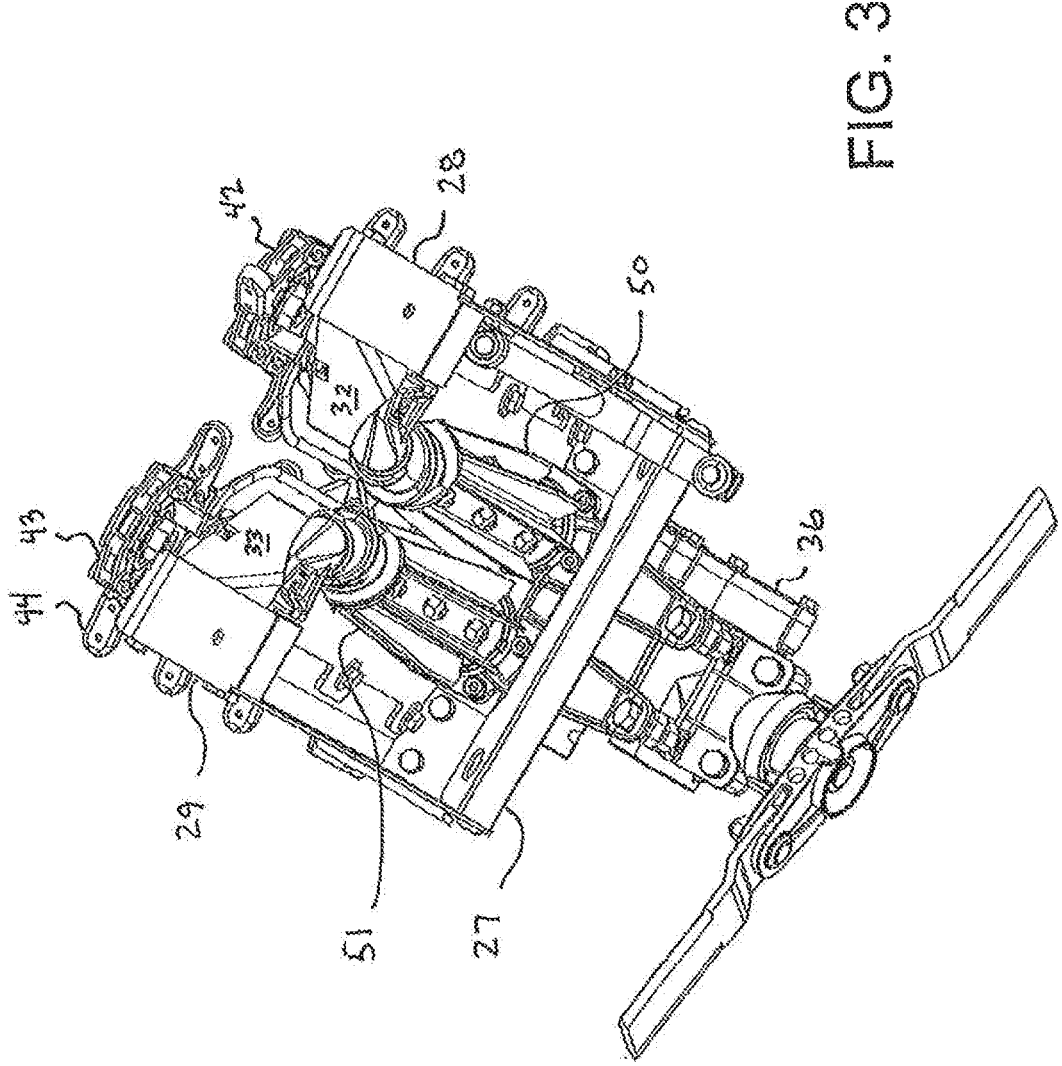
FIG. 3 is a bottom perspective view of the row unit shown in FIG. 2.

Turning now to FIGS. 2 and 3, each row unit 20 has a U-shaped row unit frame 27 with right and left, fore-and-aft extending arms 28, 29 having rear ends joined by base 30. Right and left planar deck plates 32, 33 are respectively secured to the frame arms 28, 29, with the plates 32, 33 having parallel opposed inner edges spaced apart so as to define the aforementioned longitudinal passage 24 which is adapted for receiving corn stalks of an aligned row as the row unit 20 proceeds along the row. The deck plates 32, 33 may contain laterally elongated openings (not shown) receiving fasteners so that the deck plates 32, 33 may be adjusted laterally so that the width of the passage 24 may be selectively changed depending on crop conditions.

Mounted beneath the base 30 of the row unit frame 27 is a gear box assembly 36 containing bevel gears (not shown) that drive right and left drive sprockets 38, 39. Mounted for rotation at forward ends of the arms 28, 29 are are idler sprockets 40, 41. Forming an endless loop about the right set of drive and idler sprockets 38 and 40 is a right gathering chain 42, while a similar left gathering chain 43 is looped about the left set of drive and idler sprockets 39 and 41. The gathering chains 42, 43 each include a plurality of outwardly projecting lugs 44 spaced along the length of the chains 42, 43, with the lugs 44 at inner runs of the chains 42, 43 projecting into the associated passageway 24 so as to engage stalks separated by the dividers 22. The gear box assembly 36 and means for driving the gathering chains 42, 43 may be of any known means.

As can best be seen in FIG. 3, a pair fore-and-aft extending snap rolls 50, 51 are located beneath the deck plates 32, 33 having forward ends respectively supported from the frame arms 28, 29 and are driven from the gear box assembly 36. The snap rolls 50, 51 pull the corn stalks downwardly through the passageway 24, defined by the deck plates 32, 33, so as to strip the ears, which are too large to pass downwardly through the passageway 24, off of the stalks.

The ears of corn stripped from the stalks are carried toward the feederhouse such as by an auger 26 (FIG. 1). The collected ears are then carried rearwardly and upwardly into a threshing assembly (not shown) of the combine harvester as known in the art.

As best seen in FIG. 2, a knife set 60 is located on the deck plates 32, 33 having a pair of opposing blades 62, 63 extending into the passageway 24. The blades 62, 63 may be connected with base section 61 such that the knife set 60 is a generally U-shaped integral component as in the illustrated embodiment, or the blades 62, 63 may be separately attached to row unit 20. In the illustrated embodiment, each blade 62, 63 has a main portion 64, 65 with an inner edge 66, 67 generally parallel with a longitudinal axis A of the passageway 24 and a shark-fin shaped cutting protrusion 68, 69 with a sharpened cutting edge 70, 71 extending toward the opposing blade for cutting the stalks in the passageway 24. While the illustrated embodiment has a knife set 60 with one pair of cutting protrusions 68, 69, one skilled in the art will understand that each blade 62, 63 may have more the one cutting protrusion without departing from the scope of the invention. Additionally, variations in the size and fore and aft location of the cutting protrusions 68, 69 can be made. The amount of stalk cut by the knife set 60 and fed through the combine harvester can be varied by adjusting the speed of the snap rolls 50, 51 to determine how fast the stocks are pulled downwardly past the deck plates 32, 33 and the knife set 60.

Figure 4:
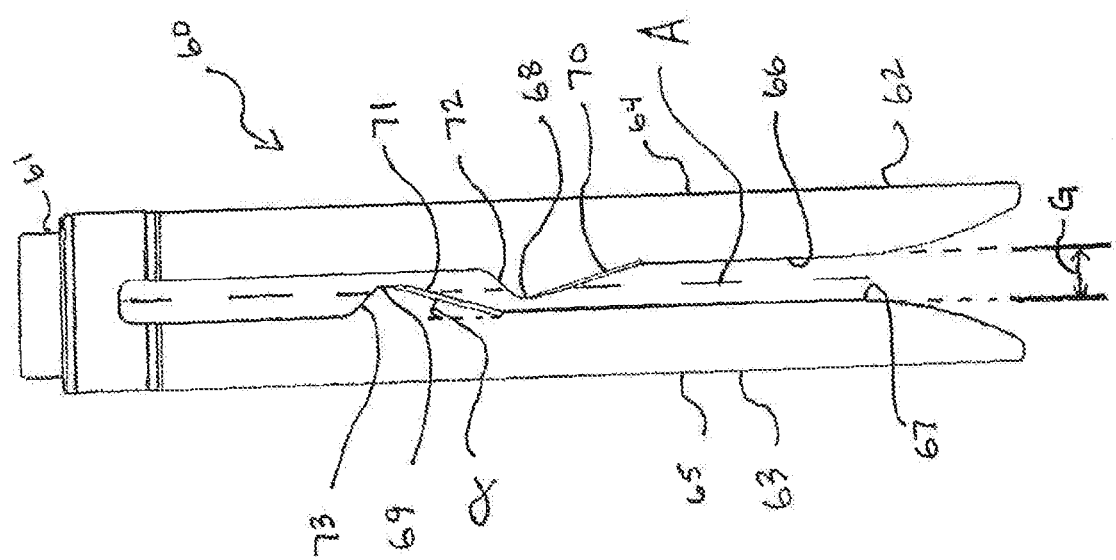
FIG. 4 is a top view of a knife set 60 of the row unit frame shown in FIG. 2.

According to the invention, the cutting protrusions 68, 69 are offset longitudinally from one another such that the cutting protrusion 68 of the right blade 62 is a different distance from the mouth of the passageway 24 than the cutting protrusion 69 of the left blade 63, so that that the cutting protrusions do not fully close the passageway 24 but leave a continuous gap G along the length of blades 62, 63. Without limiting the disclosure, it has been found that the continuous gap G between the blades 62, 63 allows for stalks being cut to be cleaned off of the cutting protrusions 68, 69, which discourages hair pinning and allows the knife set 60 to continue to cut. Desirably, as best seen in FIG. 4, the inner edge 66, 67 of the main portion 64, 65 of each blade 62, 63 remains on one side of a centerline axis A while the cutting protrusion 68, 69 reaches across to the opposing side of the centerline axis A. Desirably, the cutting protrusions 68, 69 have cutting edges 70, 71 angled into the passageway 24 with an angle α between about 10 degrees and about 60 degrees from the inner edge 66, 67 of the main portion 64, 65 of the blade 62, 63. A back slope 72, 73 of the cutting protrusion 68, 69 is desirably steeper than that of the cutting edge 70, 71. In the illustrated embodiment, a longitudinal distance between peaks of adjacent cutting protrusions 68, 69 is larger than the width of the gap G between main portions of the blades 62, 63. However, one skilled in the art will understand that other shapes for cutting protrusions, such as ones with curved cutting edges, may be used without departing from the scope of the invention.

The knife set 60 may be bolted or otherwise fastened to the deck plates 32, 33 or to arms 28, 29 of the row unit 20 using sound engineering judgment. Desirably, the knife set 60 is removable such that it can be removed when collecting only ears from the corn stalks or installed when it is desired to collect more crop residue for baling behind the combine harvester. Additionally, knife sets 60 with different cutting protrusion configurations may be selected and mounted on the row unit 20 based on the condition of the crop to be harvested.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A row-crop harvesting header for use with a harvesting machine, the harvesting header comprising a plurality of transversely spaced row units having fore-and-aft extending arms forming a passageway, a gathering mechanism to gather stalks of a row crop into the passageway, snap rolls to pull the stalks downwardly through the passageway, and a knife set configured to cut the stalks in the passageway, the knife set comprising:

first and second opposing blades, the first blade of the first and second opposing blades having a main portion with an inner edge located on a first side of a centerline of the passageway and a first cutting protrusion with a sharpened cutting edge extending across the centerline toward the second blade, the second blade of the first and second opposing blades having a main portion with an inner edge located on a second side of a centerline of the passageway and a second cutting protrusion with a sharpened cutting edge extending across the centerline toward the first blade, wherein the cutting protrusions of the first and second blades are offset longitudinally from one another such that the cutting protrusion of the first blade is a different distance from a mouth of the passageway than the cutting protrusion of the second blade such that there is a continuous gap between the first and second blades along the length of blades and extending rearward to permit travel of the stalks in the gap beyond the first and second cutting protrusions, wherein each of the first and second cutting protrusions defines a peak formed by the respective cutting edge angled into the passageway and a back slope that is angled into the passageway, wherein the back slope is angled into the passageway with an angle that is steeper than the angle of the associated cutting edge.

2. The harvesting header of claim 1 wherein the blades are be connected with a base section such that the knife set is a U-shaped integral component.

3. The harvesting header of claim 1 wherein the knife set has a single pair of cutting protrusions.

4. The harvesting header of claim 1 wherein each cutting protrusion has a cutting edge angled into the passageway with an angle between 10 degrees and 60 degrees from the inner edge of the main portion of the blade.

5. The harvesting header of claim 1 wherein the knife set is mounted to deck plates of the row unit.

6. The harvesting header of claim 1 wherein a longitudinal distance between peaks of adjacent cutting protrusions is larger than the width of the gap between the main portions of the blades.

* * * * *